United States Patent
Wagner et al.

(10) Patent No.: US 11,110,988 B2
(45) Date of Patent: Sep. 7, 2021

(54) HANDLEBAR STEM SYSTEM

(71) Applicant: Canyon Bicycles GmbH, Koblenz (DE)

(72) Inventors: Lars Wagner, Muehltal (DE); Matej Sömen, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 0 days.

(21) Appl. No.: 17/001,772

(22) Filed: Aug. 25, 2020

(65) Prior Publication Data

US 2021/0061400 A1 Mar. 4, 2021

(30) Foreign Application Priority Data

Aug. 26, 2019 (DE) ..................... 20 2019 104 673.2

(51) Int. Cl.
*B62K 21/12* (2006.01)
*B62K 21/18* (2006.01)

(52) U.S. Cl.
CPC .............. *B62K 21/12* (2013.01); *B62K 21/18* (2013.01)

(58) Field of Classification Search
CPC ........ B62K 21/02; B62K 21/04; B62K 21/12; B62K 21/16; B62K 21/18; B62K 21/22; B62K 21/24
See application file for complete search history.

(56) References Cited

U.S. PATENT DOCUMENTS

| | | | | |
|---|---|---|---|---|
| 591,864 A * | 10/1897 | Meyer | ............... | B62K 21/08 280/272 |
| 640,304 A * | 1/1900 | Lowe | ............... | F16B 7/1472 403/362 |
| 2,859,979 A * | 11/1958 | Himes | ............... | B62K 21/22 280/279 |
| 3,955,828 A | 5/1976 | Boudreau | | |
| 4,417,744 A * | 11/1983 | Spear | ............... | B62J 1/08 248/411 |
| 4,718,789 A * | 1/1988 | Kuenen | ............... | F16B 7/0446 403/233 |
| 5,193,930 A * | 3/1993 | Chi | ............... | F16B 2/08 403/24 |
| 5,437,208 A * | 8/1995 | Cheng | ............... | B62K 21/12 280/279 |
| 2019/0061864 A1* | 2/2019 | Stark | ............... | B62K 21/22 |
| 2020/0354011 A1 | 11/2020 | Wagner et al. | | |

FOREIGN PATENT DOCUMENTS

| | | |
|---|---|---|
| DE | 8500179 U1 | 5/1985 |
| DE | 4022377 A1 | 1/1992 |
| EP | 3736200 A1 | 11/2020 |
| JP | H11240480 A | 9/1999 |
| WO | 2015156480 A | 10/2015 |

OTHER PUBLICATIONS

Machine translation of DE 4022377 A1 obtained on Mar. 19, 2021.*

* cited by examiner

*Primary Examiner* — Adam D Rogers
(74) *Attorney, Agent, or Firm* — The Webb Law Firm

(57) ABSTRACT

A handlebar stem system for bicycle handlebars includes a steerer tube and a handlebar stem tube. The handlebar stem tube protrudes into the steerer tube. By means of a clamping device arranged within the steerer tube, is it possible to clampingly connect handlebar stem tube and steerer tube. According to the disclosure, the clamping device includes a clamping means, such as a screw, which protrudes into the steerer tube through an insertion opening therethrough.

13 Claims, 2 Drawing Sheets

HANDLEBAR STEM SYSTEM

CROSS-REFERENCE TO RELATED APPLICATION

This claims priority to German Patent Application No. 20 2019 104 673.2 filed Aug. 26, 2019, the disclosure of which is hereby incorporated by reference in its entirety.

BACKGROUND OF THE INVENTION

Field of the Invention

The disclosure relates to a handlebar stem system for bicycles which is particularly suitable for racing bicycles and the like.

Description of Related Art

Handlebar stem system for bicycles comprise a handlebar stem tube. Said handlebar stem tube is connectable with a handlebar stem or integrally formed therewith. The handlebar stem carries the handlebar or is also integrally formed with the handlebar. Furthermore, a handlebar stem system comprises a steerer tube. The steerer tube is particularly connected via a fork bridge with two fork legs and is usually integrally formed. For assembly, the steerer tube is inserted from below into a fork tube or head tube of a bicycle frame, respectively. The handlebar stem tube is inserted from above into the fork tube or the head tube, respectively. For the connection of steerer tube and handlebar stem tube, clamping devices are known. In this regard, it is known to widen a slitted opening of the handlebar stem tube through a in particular conically designed clamping element. This is done by pulling the conical clamping element via a screw supporting on the handlebar stem in the handlebar stem tube and by widening the handlebar stem tube by means of the conical clamping element.

Furthermore, it is known to design the steerer tube correspondingly long such that said steerer tube protrudes at the upper side for the fork tube of the bicycle frame. In this embodiments, it is then possible to fix the handlebar stem at the upper end of the steerer tube, in particular clampingly.

Known handlebar stem tube systems have the disadvantage that at least parts of the clamping means are arranged above the fork tube or the head tube of the bicycle frame, respectively. Thus, particularly the design possibilities in this area are limited.

An object of the disclosure is to create an alternative handlebar stem system.

The object of the disclosure is achieved according to this disclosure by a handlebar stem system.

SUMMARY OF THE INVENTION

The handlebar stem system according to the disclosure comprises a steerer tube as well as a handlebar stem tube protruding into the steerer tube. The steerer tube is preferably connected via a fork bridge with two fork legs, in particular integrally formed. The handlebar stem tube can be connected with the handlebar stem or can be integrally formed with the handlebar stem. The handlebar stem carries a bicycle handlebar or can also be integrally formed therewith. In addition, a clamping device is provided for clampingly connecting handlebar stem tube and steerer tube. According to the disclosure, the clamping device comprises a clamping means which protrudes into the steerer tube through an insertion opening thereof. The insertion opening is particularly an opening which is arranged in a circumferential surface or lateral surface of the steerer tube, respectively. The insertion opening of the clamping means is not the opening of the steerer tube into which the handlebar stem tube is inserted.

It is particularly preferred that the insertion opening is arranged in a mounted handlebar stem system in a front area of the steerer tube. Here, the front area is the area facing in the direction of travel. It is furthermore preferred that, relative to the longitudinal extension of the steerer tube, the insertion opening is arranged in a central area. In this respect, it is preferred that the insertion opening, with regard to the length of the steerer tube, that is the longitudinal extension of the steerer tube in longitudinal direction, is provided half way up or in the central area, respectively.

In a further particularly preferred embodiment, the steerer tube comprises a receiving opening of the clamping means opposite the insertion opening. Thus, in a preferred embodiment, the clamping means protrudes particularly transversely relative to the longitudinal direction of the steerer tube therethrough.

The clamping means particularly extends through the steerer tube, wherein for a steerer tube with a circular cross-section it is particularly preferred that the substantially cylindrical or elongated clamping means crosses the central line of the steerer tube extending in longitudinal direction.

It is furthermore preferred that a fixing element for the clamping means is provided in the area of the receiving opening. This can be, for example, a fixing element to be connected with a pin-shaped clamping means. It is particularly preferred that the clamping means comprises a thread at the area protruding into the receiving opening and that a thread is also provided as fixing element in the receiving opening. In this respect, it is preferred that the clamping means is designed as a screw or is at least pin-shaped and comprises a thread.

It is furthermore preferred that the handlebar stem tube also comprises an opening into which the clamping means protrudes. It is particularly preferred that the particularly pin-shaped clamping means, which is designed as a screw, for example, is guided through the opening in the handlebar stem tube such that the clamping means is guided through the insertion opening at the one side of the handlebar stem tube and is received by the receiving opening at the opposite side.

It is furthermore preferred that the opening of the handlebar stem tube is designed as an oblong hole which particularly extends in longitudinal direction. As a result, a height adjustment of the handlebar stem tube and thus of the handlebar is easily possible. For this purpose, the clamping means, that is particularly the screw, must only be loosened but not completely removed. The height of the handlebar stem tube can then be adjusted and the clamping means can be fixed again.

For improving the clamping effect, it is particularly preferred that at least one intermediate element is provided between the handlebar stem tube and the steerer tube. The at least one intermediate element is thus arranged between an outer side of the handlebar stem tube and an inner side of the steerer tube. In particular, an intermediate space between the handlebar stem tube and the steerer tube is filled by the at least one intermediate element, wherein a particularly complete filling is preferred. As a result, an even distribution of the clamping force can be realized. For this purpose, it is furthermore particularly preferred that two intermediate elements are provided which are disposed opposite to one another. Each of the two intermediate elements is thus arranged between the handlebar stem tube and the steerer tube, wherein it is particularly preferred that one intermediate element is arranged in the mounted state in the direction of travel in front of the handlebar stem tube and the other is arranged in the direction of travel behind the handlebar stem tube. Thus, the clamping can be further improved.

It is also possible that the cross-sectional shape of the handlebar stem tube differs from the cross-sectional shape of the steerer tube. In particular, a non-circular handlebar stem tube can be arranged in a preferably circular steerer tube. For this purpose, it is possible to provide a flexible handlebar steerer tube, for example, which can be flexibly formed within the steerer tube, in particular for damping shocks. It is particularly possible that the handlebar stem tube comprises a cross-section whose dimensions in the mounted state are smaller in the direction of the travel than the dimensions transverse to the direction of travel. The handlebar stem tube is particularly formed horizontally oval. Such a wide handlebar stem tube has the advantage that a bending or flexing in the direction of travel is possible. Said bending or flexing is particularly carried out within the steerer tube in the direction of travel. Traverse to the direction of travel, such a handlebar stem tube has a higher stiffness. The travelling comfort can be significantly improved by such a designed handlebar stem tube since particularly shocks are well absorbed or damped, respectively.

In order to ensure an easy assembly, it is preferred in a particularly preferred development of the disclosure that an access opening is provided in the fork tube or the head tube. Through said access opening, the clamping means, which is particularly designed as a screw, is accessible. For a clamping means arranged in the central or front area of the steerer tube, the access opening is thus also preferably arranged in the central or front area of the fork tube or the head tube, respectively. The opening can be closable by a plug or the like in order to avoid penetration of moisture.

A particular advantage of the embodiment of the handlebar stem system according to the disclosure and the arrangement of the clamping device inside the steerer tube of bicycle frame is that the area above the steerer tube, in which the handlebar stem is arranged, can be more freely designed and that particularly aerodynamic configuration are possible. The handlebar stem can particularly be designed such that it does not protrude beyond the top tube of the bicycle frame. Furthermore, lower handlebar positions and/or other configurations of the overall frame design are thereby possible.

The disclosure further relates to a bicycle frame comprising a fork tube which is designed as described above and particularly comprises an access opening for the clamping means. The bicycle frame further comprises the usual components such as a down tube, a saddle tube and optionally also a top tube.

BRIEF DESCRIPTION OF THE DRAWINGS

In the following, the disclosure is described in more detail by means of the preferred embodiment with reference to the attached drawings in which.

DESCRIPTION OF THE INVENTION

Figure 1:
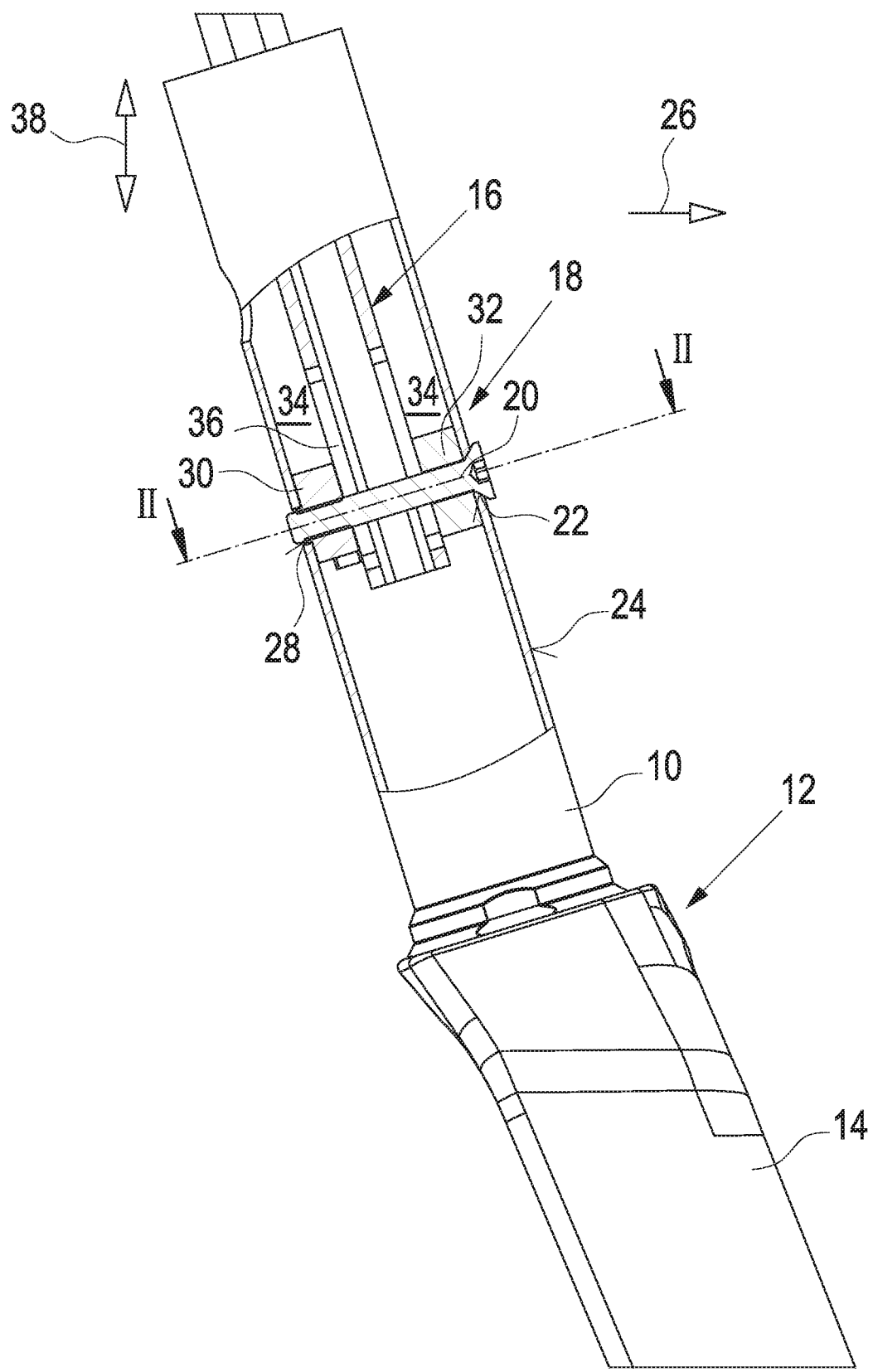
FIG. 1 shows a schematic partially sectioned side view of a handlebar stem system.

The handlebar stem system according to the disclosure comprises a steerer tube 10 which is connected via a fork bridge 12 with two fork legs 14, in particular integrally formed (FIG. 1). A handlebar stem tube 16 is arranged within steerer tube 10. The handlebar stem tube 16 is clampingly connected with steerer tube 10 via a clamping device 18 which substantially is also arranged within steerer tube 10.

The clamping device 18 comprises for this purpose a clamping means 20 which is designed in the shown exemplary embodiment as a screw, wherein the clamping means is arranged in an insertion opening 22. The insertion opening 22 is arranged in a circumferential surface 24 of steerer tube 10, in particular at a front side. Here, the front side is the side of the steerer tube which in the mounted state faces in the direction of travel 26.

The clamping means 20 protrudes through steerer tube 10 into an opposite receiving opening 28 which is also provided in steerer tube 10. The receiving opening 28 comprises in the shown exemplary embodiment an inner thread as a fixing element such that an outer thread of clamping means 20, which is designed as a screw, can be screwed into the inner thread.

Figure 2:
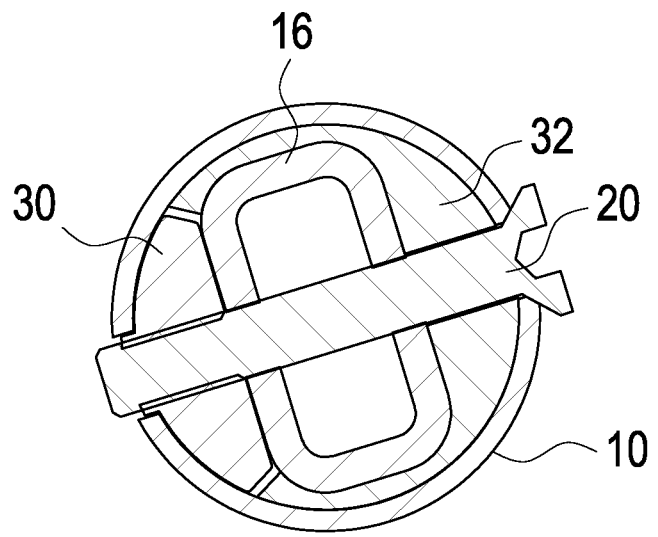
FIG. 2 shows a schematic sectional view along the line II-II in FIG. 1.

For further improvement of the clamping connection between steerer tube 10 and handlebar stem tube 16, two intermediate elements 30, 32, such as clamping stones 30, 32, are arranged between steerer tube 10 and handlebar stem tube 16. The clamping stones 30, 32 preferably completely fill intermediate space 34 between the outer side of handlebar stem tube 16 and the inner side of steerer tube 10 (FIG. 2). For this purpose, it is also possible, as can be seen in FIG. 2, that the two intermediate elements are designed differently and that a, in the direction of travel, front intermediate element 32 is also arranged laterally adjacent to handlebar stem tube 16 or surrounds the handlebar stem tube in a U-shaped manner similar to a clamp.

Moreover, handlebar stem tube 16 comprises an opening 36 which is particularly designed as an oblong hole, wherein handlebar stem tube 16 can be designed, as illustrated, as a hollow profile. By designing opening 36 as an oblong hole in the longitudinal direction of handlebar stem tube 16, it is easily possible to adjust the height of the handlebar stem tube and thus of the handlebar stem or the handlebar, respectively. This can be realized by simply loosing screw 20 and displacing the handlebar stem tube in longitudinal direction 38. The fixation is then realized by simply tightening screw 20 and thus by clampingly holding handlebar stem tube 16 in steerer tube 10 via the two intermediate elements 30, 32.

Figure 3:
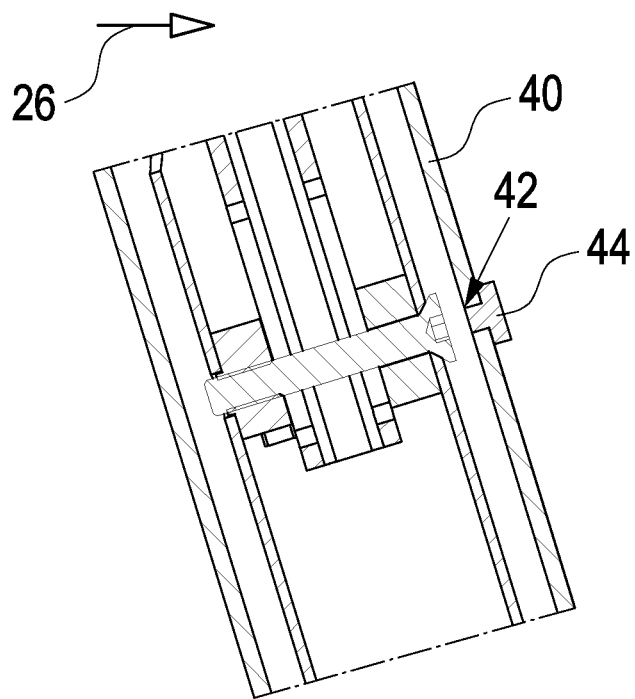
FIG. 3 shows a section of the handlebar stem system in the area of the clamping device in the mounted state.

For simple assembly, a fork tube or head tube 40 (FIG. 3) of the bicycle frame comprises an opening 42 which is also arranged in the front area of steerer tube 10. The front area is in turn the area of the steerer tube facing in the direction of travel 26. Through the opening, screw 20 can for example be loosened or fixed with a corresponding wrench. The opening 42 is closed with a plastic plug 44 or the like in order to avoid penetration of moisture.

The invention claimed is:

1. A handlebar stem system for racing bicycle handlebars, comprising:
   a steerer tube,
   a handlebar stem tube protruding into the steerer tube, and a clamping device for clampingly connecting the handlebar stem tube and the steerer tube, wherein the clamping device comprises a clamping means protruding into the steerer tube through an insertion opening thereof and the steerer tube comprises a receiving opening opposite the insertion opening for the clamping means.

2. The handlebar stem system according to claim 1, wherein the insertion opening is arranged in a circumferential surface of the steerer tube.

3. The handlebar stem system according to claim 1, wherein the insertion opening is arranged in a mounted state in a front area and in a longitudinal direction of the steerer tube in a central area of the steerer tube.

4. The handlebar stem system according to claim 1, wherein in an area of the receiving opening, a fixing element for the clamping means is provided.

5. The handlebar stem system according to claim 1, wherein the clamping means comprises a screw and a fixing element is formed as an inner thread.

6. The handlebar stem system according to claim 1, wherein the handlebar stem tube comprises an opening into which the clamping means protrudes into and is guided therethrough.

7. The handlebar stem system according to claim 6, wherein the opening is formed as an oblong hole and is provided for height adjustment of the handlebar stem tube.

8. The handlebar stem system according to claim 1, wherein between the handlebar stem tube and the steerer tube at least one intermediate element is provided.

9. The handlebar stem system according to claim 8, wherein the at least one intermediate element is arranged in an intermediate space between the handlebar stem tube and the steerer tube.

10. The handlebar stem system according to claim 1, wherein the handlebar stem tube comprises a cross-sectional shape which differs from a cross-sectional shape of the steerer tube.

11. The handlebar stem system according to claim 10, wherein the handlebar stem tube comprises a non-circular cross-sectional shape.

12. A handlebar stem system for racing bicycle handlebars, comprising:

a steerer tube, a handlebar stem tube protruding into the steerer tube, and a clamping device for clampingly connecting the handlebar stem tube and the steerer tube, wherein the clamping device comprises a clamping means protruding into the steerer tube through an insertion opening thereof, and wherein between the handlebar stem tube and the steerer tube two opposite intermediate elements are provided, each of which is arranged between the steerer tube and the handlebar stem tube.

13. A handlebar stem system for racing bicycle handlebars, comprising:

a steerer tube, a handlebar stem tube protruding into the steerer tube, and a clamping device for clampingly connecting the handlebar stem tube and the steerer tube, wherein the clamping device comprises a clamping means protruding into the steerer tube through an insertion opening thereof, and wherein in a mounted state the steerer tube is arranged in a fork tube of a bicycle frame, wherein the fork tube comprises an access opening to the clamping means.

\* \* \* \* \*